(12) United States Patent
Nakai et al.

(10) Patent No.: US 8,568,916 B2
(45) Date of Patent: Oct. 29, 2013

(54) LITHIUM ION SECONDARY BATTERY

(75) Inventors: Kenji Nakai, Fukaya (JP); Akinori Tada, Hitachinaka (JP); Masatsugu Arai, Kasumigaura (JP); Kinya Aota, Hitachi (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 742 days.

(21) Appl. No.: 12/269,081

(22) Filed: Nov. 12, 2008

(65) Prior Publication Data

US 2009/0136835 A1 May 28, 2009

(30) Foreign Application Priority Data

Nov. 13, 2007 (JP) ................................ 2007-294600

(51) Int. Cl.
*H01M 2/26* (2006.01)

(52) U.S. Cl.
USPC ........................................................ 429/161

(58) Field of Classification Search
USPC .................. 429/129, 163, 164, 161
See application file for complete search history.

(56) References Cited

U.S. PATENT DOCUMENTS

| | | | |
|---|---|---|---|
| 6,653,017 B2 | 11/2003 | Satoh et al. | |
| 2002/0004162 A1* | 1/2002 | Satoh et al. | 429/94 |
| 2004/0247998 A1* | 12/2004 | Nakanishi et al. | 429/161 |
| 2005/0260487 A1 | 11/2005 | Kim et al. | |
| 2008/0305393 A1* | 12/2008 | Nakai et al. | 429/209 |
| 2010/0316897 A1 | 12/2010 | Kozuki et al. | |

FOREIGN PATENT DOCUMENTS

| | | |
|---|---|---|
| EP | 1 076 371 | 2/2001 |
| EP | 2 003 716 | 12/2008 |
| JP | 2002-100342 | 4/2002 |
| JP | 2004-234994 | 8/2004 |
| JP | 2005-142026 | 6/2005 |
| JP | 2005-332816 | 12/2005 |

(Continued)

OTHER PUBLICATIONS

European Search Report EP Application No. 08019840.1, dated Mar. 23, 2009.

(Continued)

*Primary Examiner* — Patrick Ryan
*Assistant Examiner* — Muhammad Siddiquee
(74) *Attorney, Agent, or Firm* — Antonelli, Terry, Stout & Kraus, LLP.

(57) ABSTRACT

A lithium ion secondary battery comprises a case; a positive electrode foil having a current collector foil on which a positive electrode material is coated; an negative electrode film having a current collector film on which an negative electrode material is coated; a separator sandwiched between the positive electrode film and the negative electrode film, the films and the separator being arranged in multiple layers to form a group of electrodes enclosed in the case, a positive collector disc plate connected to the positive electrode side of the group of the electrodes, and an negative collector disc plate connected to the negative electrode side of the group of the electrodes. Each of the current collector foils has a non-coated portion extended along one side of the foils, a part or the entire of the non-coated portion being exposed from a side of the separator. At least one of the collector disc plate is welded to the side of the exposed non-coated portion of the group of the electrodes. The periphery of the collector disc plate has an annular portion, which is bent towards the group of electrodes.

7 Claims, 9 Drawing Sheets

(56) References Cited

FOREIGN PATENT DOCUMENTS

| JP | 2009-110751 | 5/2009 |
|---|---|---|
| KR | 2005-110459 A1 | 11/2005 |
| WO | WO 97/18594 | 5/1997 |
| WO | WO 2007/102527 | 9/2007 |

OTHER PUBLICATIONS

Korean Office Action dated Jan. 12, 2011 with partial translation.
Chinese Office Action of Appln. No. 200810170425.1 mailed Jul. 30, 2010.
Second Chinese Office Action, dated Aug. 10, 2011 in CN 2008-10170425.1 (in Chinese, 4 pages), with partial translation of Second Chinese Office Action dated Aug. 10, 2011.
Second Korean Office Action, dated Aug. 31, 2011 in KI 2008-111494 (in Korean, 4 pages), with partial translation of Second Korean Office Action dated Aug. 10, 2011.
Communication mailed Jun. 19, 2012, in connection with Japanese Patent Application No. 2007-294600; 3 pages; Japanese Patent Office, Japan.
Communication mailed Nov. 5, 2012, in connection with Chinese Patent Application No. 200810170425.1; 4 pages; Chinese Patent Office, Republic of China.

* cited by examiner

LITHIUM ION SECONDARY BATTERY

CLAIM OF PRIORITY

The present application claims priority from Japanese patent application serial No. 2007-294600, filed on Nov. 13, 2007, the content of which is hereby incorporated by reference into this application.

FIELD OF THE INVENTION

The present invention relates to a lithium ion secondary battery, and more particularly to a lithium ion secondary battery comprising a positive electrode having a positive electrode material coated on a positive collector foil and an electrode having an negative electrode material coated on an negative collector foil, the positive electrode and the negative electrode being arranged by means of a separator so as to form a group of electrodes included in a case.

RELATED ART

A conventional lithium ion secondary battery comprises a positive having a positive material substantially homogeneously coated on both sides of a collector foil such as aluminum foil and an negative electrode having an negative electrode material substantially homogeneously coated on both sides of an negative collector foil such as copper foil and a separator sandwiched between the positive electrode foil and the negative electrode foil, the positive electrode, negative electrode and separator being laminated or wound to form a group of electrodes. The group of the electrodes are included or encased in a case together with an electrolyte solution.

In lithium ion secondary batteries for high rate use (high efficiency charge-discharge use) in pure electric vehicles (PEV), hybrid-cars (HEV), etc, non-coated portions of the foils are cut into strips or teeth with an oblong form, the strips being contiguous in a lengthwise direction of the foils to form leads, which are connected to a collector element. This technology is disclosed in Japanese Patent Laid-open 2004-234994, for example.

SUMMARY OF THE INVENTION

The following are the analysis of a related conventional technology owned by the inventors; thus the following do not belong to prior art.

When the above-mentioned structure is employed so as to satisfy a large current-high rate performance, there are following problems in view of industrial production. The machining of the non-coated portions into oblong forms (stripes or teeth) takes a long time with low productivity. An amount of waste foil is considerable, which leads to a low yield of material usage.

In winding the laminate of the positive electrode foil, separator and negative electrode foil, wherein the electrode foils have the oblong form stripes (leads), the stripes are spread radially by a centrifugal force of the winding machine, the stripes may be bitten or included in the group of electrodes. As a result, the electrical insulation among the electrodes is damaged. In addition, since the non-coated portion connected to the stripes must cover the end portion of the group of the electrodes, impregnation of an electrolyte into the group of the electrodes is obstructed and takes a long time, which lead to an increase in a production cost.

In the present specification, the positive electrode is used to mean an electrode in a higher potential than the other (negative electrode) in charge and discharge. In discharge, the positive electrode accepts electrons, and the negative electrode discharge electrons.

On the other hand, in order to eliminate the above-mentioned problems, it may be possible to use the non-coated portion of the foil without machining the foil into the stripe form or to shorten the length of the stripes; electric resistance of the collector structure may increase depending on the welded status or reliability of the welded structure may decrease. Particularly, when the non-coated portion is not machined into stripes, that is, a straight form non-coated portion is used, the above problem may be solved if the straight form non-coated portion of the electrode foil is exposed from the longitudinal ends of the wound separator film, which is sandwiched between the positive electrode foil and the negative electrode foil, and if the collector plates are electrically connected with low resistance to the ends of the group of the collectors. However, it is not easy to perform uniform welding of the electrode foils with a small thickness and the collector disc plates with a relatively large thickness because of a big difference in thickness.

In welding of the members of different thickness, it may be preferable to perform welding by transforming light energy into heat energy, because mechanical force is not imparted to the members to be welded and a welding speed is relatively high. However, In welding by transforming light energy to heat energy, such as laser welding, if welding starts and ends at edges of the collector disc plates, heat for irradiation energy may be focused on the ends because of little of spaces for releasing heat, and through holes may be formed in the collector disc plates. When the through holes are formed, the irradiation energy directly irradiates the group of the electrodes. In this case, the separator whose melting point is lowest is damaged by heat, which leads to insulation resistance fault because of loss of electrical insulation by the separator.

Laser irradiation is conducted along the projected portions or thick portions in a strip form for example, which are formed in the face opposite to the annular portion. The thick portions or projected portions are melted by heat of laser to droop from the disc plate towards the end of the group of the electrodes so that the end of the group of the electrodes and the disc plate is welded.

The annular portion extending and preferably being bent outwardly is designed to cover the end entirely so that heat energy is utilized effectively for welding.

A shape of the annular portion formed on the rim of the collector disc plate may be changed to a polygon form such as a rectangular form.

If the irradiation is performed at positions in order to avoid the above problems, start point of irradiation and end point of the irradiation become the start and end of the melting of the members. As a result, the molten metal becomes instable, and the irradiation may penetrate through the stripe collectors. This is not changed even if the irradiation starts with a preparatory step.

Further, the irradiation starts from points where there do not exist the ends of the stripe collectors, welding between the stripe collectors and the positive electrode foil and negative electrode foil that are located at the rear side of the irradiation may be not performed, which leads to an increase in internal resistance and decrease in output of the battery. These are the problems of performance and quality of the battery in the conventional technology.

An object of the present invention is to provide a lithium ion secondary battery for high rate use at a low production cost, good at assembly, and high reliability.

In order to achieve the above object, the present invention provides a lithium ion secondary battery comprising a case; a positive electrode foil; an negative electrode film; a separator sandwiched between the positive electrode film and the negative electrode film, the films and the separator being arranged in multiple layers to form a group of electrodes enclosed in the case; a non-hydrous electrolyte solution in the case; a positive collector disc plate connected to the positive side of the electrodes; and an negative collector disc plate connected to the negative electrode side of the electrodes; wherein each of the current collector foils has a non-coated portion extended along one side of the foils, a part or the entire of the non-coated portion being exposed from a side of the separator, and wherein the collector disc plates are connected to the exposed non-coated portion, the periphery of the collector disc plate having an annular portion, which is bent towards the group of electrodes. The projected rim should cover entirely the end of the group of the electrodes to improve energy efficiency for welding.

A typical embodiment of the lithium ion secondary battery of the present invention is a lithium ion secondary battery comprising a case; a positive electrode film having a current collector foil on which a positive electrode material is coated; an negative electrode film having a current collector foil on which an negative electrode material is coated; a separator sandwiched between the positive electrode film and the negative electrode film, the electrode films and the separator being arranged in multiple layers to form a group of electrodes enclosed in the case, the electrode films in the case being impregnated with a non-hydrous electrolyte solution, a positive collector disc plate connected to the positive electrode side of the group of the electrodes, and an negative collector disc plate connected to the negative electrode side of the group of the electrodes, wherein each of the current collector foils has a non-coated portion extended along one side of the foils, a part or the entire of the non-coated portions being exposed from a side of the separator, and wherein the collector disc plates, which are welded to the sides of the exposed non-coated portions of the group of electrodes, at least one of the periphery of the collector disc plate having a projected rim such as an annular portion, which is bent towards the group of the electrodes.

In another aspect of the lithium ion secondary battery according to the present invention, the edge portion of the exposed non-coated portion is included in the annular portion of the collector plate, and the edge portion of the exposed non-coated portion constitutes welded portions.

In still another aspect of the lithium ion secondary battery of the present invention, the inside of the annular portion is located inside of the group of the electrodes, and edge of the exposed non-coated portion is bent and included in the annular portion.

A further aspect of the lithium ion secondary battery of the present invention, welded portion between the edge of the exposed non-coated portion and the collector disc plate is formed at an opposite side of the group of the electrodes.

A still further aspect of the lithium ion secondary battery of the present invention, the welded portion is free from another metal than the foil. That is, the welded portion is constituted only by the electrode foil material and the collector disc plate material.

Another aspect of the lithium ion secondary battery of the present invention, a thickness of the annular portion formed in the outer periphery of the collector disc plate, extending in one face thereof, is larger than a welded portion.

According to the present invention, machining of the elongated non-coated portion into a stripe form is not necessary because collector disc plates (positive disc plate and negative electrode disc plate) are welded to a part or the whole of the non-coated portion, which is exposed from the longitudinal sides of the separator. Accordingly, productivity and assembly of the battery are improved and production cost is reduced.

Since each of the collector disc plates has a annular portion at a periphery thereof, which is bent towards the group of the electrodes, it is possible to perform uniform and reliable welding, which is free from through holes in the collector disc plates.

The present invention provides a method of manufacturing a lithium ion secondary cell, which comprises:

preparing at least one positive collector disc plate and a negative collector disc plate having a projected rim such as an annular portion or a polygon portion extending in one direction on a periphery thereof and a plurality of thick portions extending in a radial direction of the disc plate, and a laminate of a positive electrode film, a negative electrode film and a separator sandwiched between the films, the positive electrode film having positive active material and the negative electrode film having a negative active material, wherein the electrode foils of the laminate has a non-coated portion extending along the length of the laminate, the laminate forming a group of electrodes having an end formed at the non-coated portion side;

bringing at least one of the collector disc plates into contact with the end of the group of electrodes formed by a laminate; and welding at least one of the positive electrode disc plate and negative electrode disc plate to the end of the group of the electrodes by irradiating heat energy along with the thick portions.

The present invention further provides the method of manufacturing a lithium ion secondary battery, wherein the welding is conducted to the both electrode disc plates and the end of the group of the electrodes.

The present invention further provides the method of manufacturing a lithium ion secondary battery, wherein the welding is carried out by laser beam welding.

The present invention still further provides the method of manufacturing a lithium ion secondary battery, wherein the annular portion covers an outer periphery of the end of the group of the electrodes.

The present invention provides the method of manufacturing a lithium ion secondary battery, wherein the group of the electrodes is formed by winding a laminate of the positive electrode film, negative electrode film and separator.

The present invention provides the method of manufacturing a lithium ion secondary battery, wherein the thick portions are melted and the melted metal forms welded bond with the end of the group of electrodes.

The present invention provides the method of manufacturing a lithium ion secondary battery, wherein the annular portion is bent outwardly.

DETAILED DESCRIPTION OF THE PREFERRED EMBODIMENTS

Preferred embodiments of the lithium ion secondary battery of the present invention will be explained in detail by reference to the accompanied drawings.

In the following the materials for positive active materials, negative active materials, electrode foil, case, electrolyte solution, etc have been well known in this field.

The present invention may employ the conventional materials, conductive material, separator, binder, etc. Accordingly, the following description will be made to avoid too much detailed description.

(Preparation of a Positive Electrode Foil)

Figure 2:
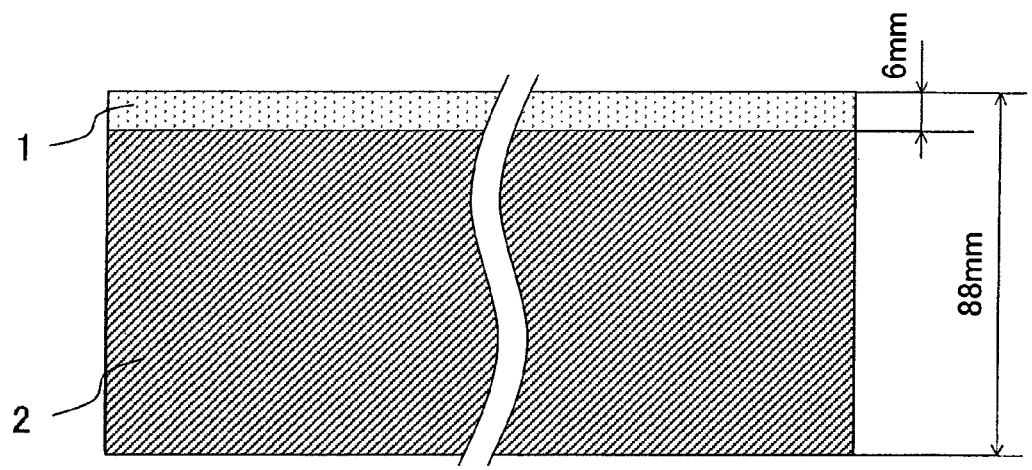
FIG. 2 is a plan view of a positive electrode foil of the lithium ion secondary battery of one embodiment according to the present invention.

As a positive active material, prepared was a mixture of $LiMn_2O_4$ powder of lithium transition metal composite oxide, graphite powder as a main conductive material and polyvinylidene fluoride (PVDF) as a binder in a weight ratio of 85:8:2:5. Added was N-methyl-pyrrolidone (NMP) as a dispersing solvent to the mixture to obtain a slurry. The slurry was coated substantially homogeneously on both sides of aluminum foil (positive collector) with a thickness of 20 μm. The collector foil was provided with non-coated portion 1 with a width of 6 mm at the one edge along the longitudinal direction of the foil, as shown in FIG. 2. The positive electrode foil was dried, pressed and cut into a positive electrode foil strip 2 with a width of 88 mm.

(Preparation of Negative Electrode Foil)

Figure 3:
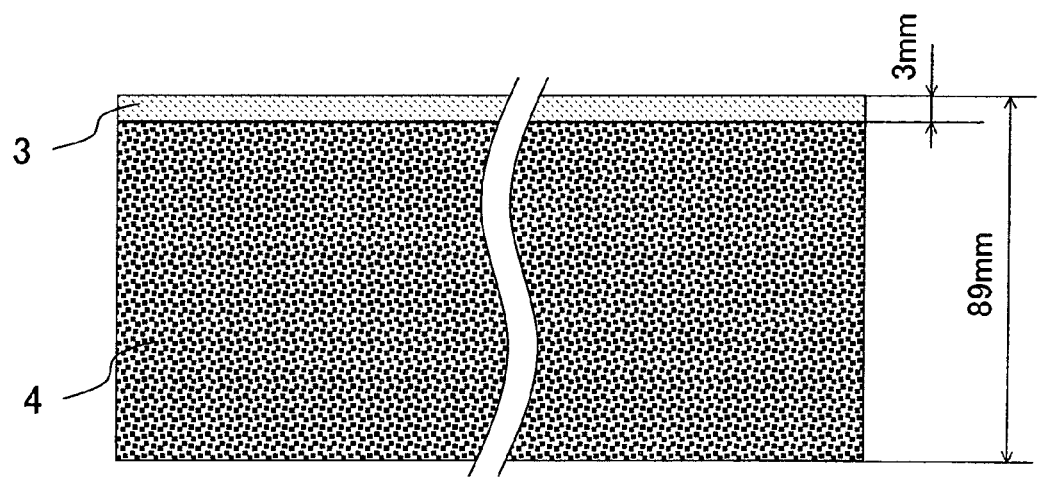
FIG. 3 is a plan view of an negative electrode foil of the lithium ion secondary battery of the same embodiment as the above one according to the present invention.

Prepared was a slurry comprising 92 weight parts of easy graphitizing carbon powder, 8 weight parts of polyvinylidene fluoride and NMP. The mixture was kneaded. The slurry was substantially homogeneously coated on both sides of copper foil (negative collector) with a thickness of 20 μm. The copper foil was provided with a non-coated portion 3 with a width of 3 mm at one side thereof along the longitudinal direction of the foil. See FIG. 3. The negative electrode foil was dried, pressed and machined into the negative electrode foil 4 with a width of 89 mm. An amount of coated negative active material was such that amounts of lithium ions that are released from a positive electrode at the time of first charging and that absorbed in the negative electrode at the time of first discharging are 1:1, respectively.

(Preparation of a Group of Electrodes)

Figure 4:
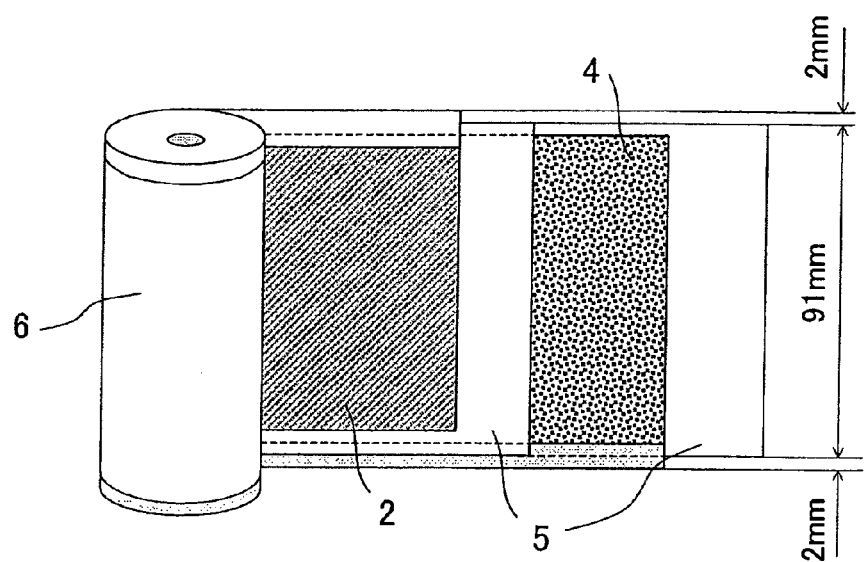
FIG. 4 is an exterior view of a group of electrodes formed by winding a laminate of the positive electrode foil, separator film and negative electrode foil according to an embodiment of the lithium ion secondary battery of the present invention.

As shown in FIG. 4, the group of electrodes 6 was formed by winding a laminate of the positive electrode foil 2, a separator of polyethylene with a width of 91 mm and a thickness of 30 μm and the negative electrode foil 4. A reel 12 of polypropyrene (see FIG. 1) was used.

The non-coated portion 1 of the positive electrode side and the non-coated portion 4 of the negative electrode side were arranged to be located at opposite sides respectively, wherein the non-coated portions were exposed from the sides of the separator 5 by 2 mm. Lengths of the positive electrode foil 2, separator 5 and the negative electrode foil 4 were adjusted to form an inner diameter of 9 mm of the group of the electrodes, an outer diameter of 38±0.1 mm. In order to prevent unwinding of the group of the electrodes, a bonding tape made of polyimide substrate and hexamethacrylate coated on one side of the substrate was used to fix the ends of the wound.

(Assembly of Battery)

Figure 5A:
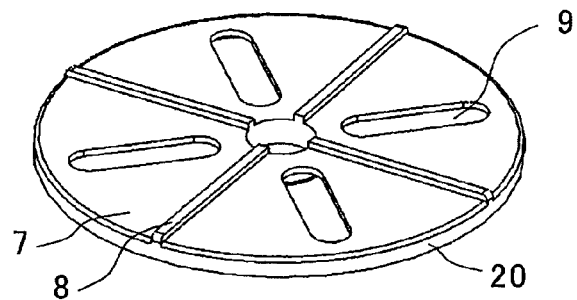
FIG. 5A shows a perspective top view of a collector disc plate of the lithium ion secondary battery of the embodiment.
Figure 5B:
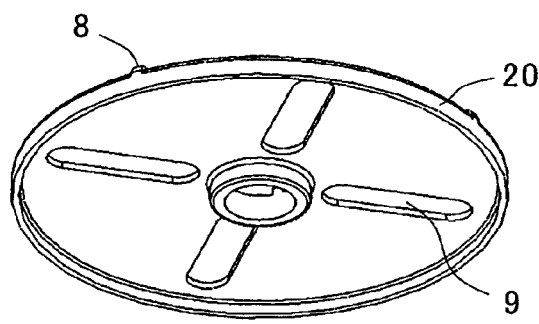
FIG. 5B shows a perspective bottom view of the collector disc plate of the lithium ion secondary battery of the embodiment.
Figure 5C:
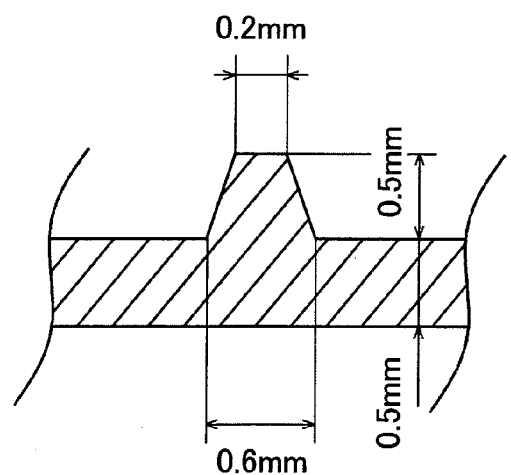
FIG. 5C is a cross sectional view of the collector disc plate.

Collector disc plates were positioned at both ends of the group of the electrodes. As shown in FIGS. 5A and 5B, the collector disc plates 7 have on one side thereof four radial projections 8 extending from the center of the disc towards the periphery thereof. As shown in FIG. 5C, each of the projections 8 has a shape of trapezoid in its cross sectional view. The collector disc plates 7 have a thickness of 0.5 mm, and each of the projections has a width of 0.2 mm at the top, 0.6 mm at the bottom and a height of 0.5 mm.

At portions where the projections are not formed, a plurality of slits 9 (four in this case) for passages for non-aqueous electrolyte liquid. The materials for the collector disc plates should preferably be the same materials as those of the electrodes. If the positive electrode foil is made of aluminum, the electrode disc should be aluminum. If the negative electrode foil is made of copper, the electrode at the negative electrode side should be copper.

The periphery of the electrode disc plate at one side has a annular portion 20 that is bent downwardly (the group of the electrode side 6). The center of the electrode disc plate 7 in the opposite side (where the annular portion does not exist) are provided with cylindrical projections for fitting the axis 12 of the group of the electrodes 7.

After the side of the collector disc plate 7 where no projections 8 are formed was butted towards the group og the electrodes, laser light was irradiated along the projections 8 onto the top faces of the projections 8 from the side where the projection 8 are formed to thereby melt the irradiated portion to weld the collector foil located at the rear side of the irradiation side. The length of the projections 8 was decided so that the collector foils wound around the center axis of the group electrodes is positioned below the projections 8.

Laser light irradiation was performed with respect to every projection 8. The width of melting by welding (loop width of welding) was 0.8 mm for positive electrode side and negative electrode side, respectively.

As a welding apparatus, used was YLR-2000, a Yb fiber laser welding apparatus, manufactured by IPG Photonics using an optical system having a focusing distance of 125 mm and a laser spot diameter of 0.1 mm at the focusing position. A travel speed of the laser light was 5 m/min. The laser beam was focused on the top of the projection. Output conditions of the laser apparatus were set so that the projections 8 of the collector disc plate 7 were melted to go down and the top of the projection 8 became the same level as the surrounding or the top of the melted projection was not higher than about 20% of the height of the projections. These conditions were decided experimentally by finding that the melted projections 8 dropped down to the side of the collector disc plate (other side) and the melted material was suitable for welding of the electrode foils (positive electrode foil and negative electrode foil). If the intensity of the laser output is too high, the laser light penetrates the electrode foils to cut down, and if the laser output is too low, a sufficient drop down of melted material is not expected. As a result, good welding is not obtained because of insufficient drop down of melted material.

Figure 1:
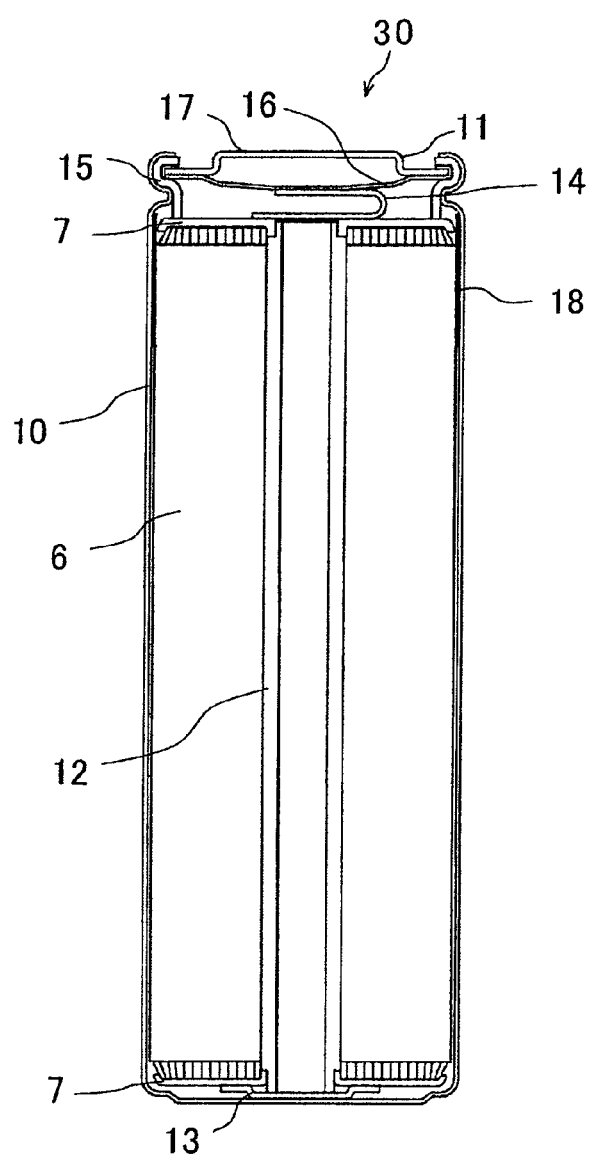
FIG. 1 is a diagrammatic cross sectional view of a lithium ion secondary battery according to the present invention.

Next, a bonding tape 18, which comprises a substrate of polyimide and a coating of hexamethacrylate coated on one side of the substrate, was adhered to an outer periphery and surrounding of the positive collector disc plate 7 of the group of electrodes 6 so as to perform electrical insulation (See FIG. 1).

Next, as shown in FIG. 1, a negative lead 13 made of nickel having a thickness of 0.5 mm was welded by laser welding to the welded side of the collector disc plate 7 of the negative electrode side of the group of the electrodes 6. The welded part was inserted into a nickel-plated closed case 10 made of iron having a thickness of 0.5 mm. The negative lead 13 and the bottom of the case 10 were bonded by resistance welding. Further, laser light was irradiated from outside of the case 10 to increase the number of welding spots of the negative lead 13 and the bottom of the case 10.

Figure 6:
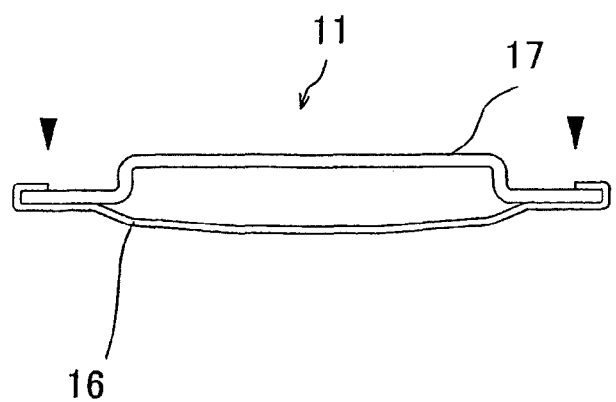
FIG. 6 is a diagrammatic cross sectional view of a top lid of the lithium ion secondary battery shown in FIG. 1.

Next, an end of an aluminum positive lead 14 having a width of 16 mm and a thickness of 0.3 mm was welded to the collector disc plate 7 of the positive electrode side, and the other end of the positive lead 14 was bonded by welding, as shown in FIG. 6, to an aluminum disc plate 16 constituting an upper lid 11. The upper lid 11 was constituted by imposing an edge of an aluminum made outer lead disc 17 having a thickness of 1 mm on an edge of the aluminum disc plate 16 with a space therebetween, and the periphery of the aluminum disc plate 16 was curved and caulked. The curved and wrapped portion was laser-welded by irradiating laser light along the periphery onto the top face of the curved and wrapped portion. See black triangles in FIG. 6.

50 g of a non-hydrous electrolyte solution was charged into the assembled battery, and then a polypropylene gasket 15 and the upper lid 11 were inserted into the opening of the case 10. The opening of the case was caulked to seal so as to complete a lithium ion secondary battery 30. The non-hydrous electrolyte solution contained hexafluoride phosphate lithium ($LiPF_6$) in a concentration of 1 mol/L dissolved in a mixed solvent comprising ethylene-carbonate and dimethyl carbonate in a mixing ratio of 2:3 by volume.

After the battery was assembled, the battery was charged under a 2 A constant current to 4.0 V at room temperature, followed by charging it under a 4.0 V constant voltage to a decayed current of 0.1 A. Thereafter, an alternative impedance was measured at ambient temperature and battery temperature of 25±0.5° C.

EXAMPLES

Examples of the present invention will be explained by reference to the battery 30 assembled in accordance with the present invention. Lithium ion secondary batteries of comparative examples are explained, too.

Example 1

Figure 7:
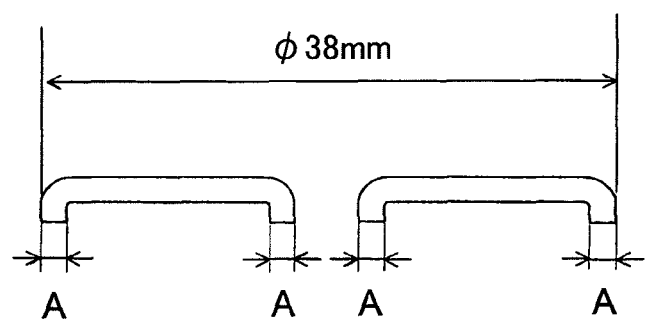
FIG. 7 is a cross sectional view along the longitudinal direction of the radial projections of the collector disc plate.
Figure 8A:
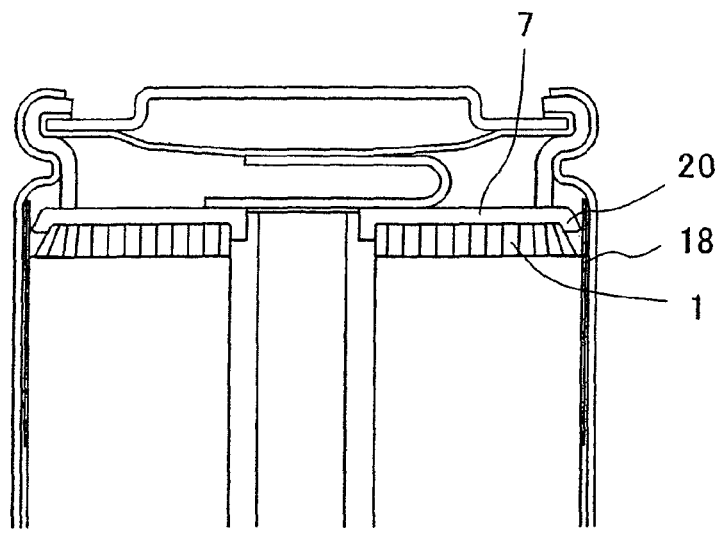
FIG. 8A shows an upper part (positive electrode side) of the lithium ion secondary battery of example 1.

FIG. 7 shows a cross sectional view of the collector disc plate 7 along the center line thereof, which shows projections 8. An outer diameter of the disc plate was 38 mm. "A" that represents a thickness of the annular portion 20 of the disc plate 7 was 1 mm. The outer diameter of the group of the electrodes was 38 mm. The positive collector foil of the group of the electrodes 6 that is exposed from the separator 5 was confined in the inside of the annular portion 20 of the collector disc plate 7, as shown in FIG. 8A. The outer part of the exposed portions was bent.

Figure 8B:
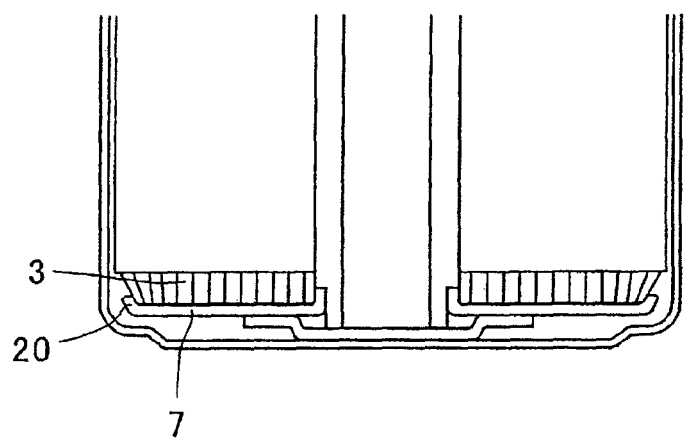
FIG. 8B shows a lower part (negative electrode side) of the lithium ion secondary battery of example 1.

The negative collector foil exposed from the separator of the group of the electrodes 6 was confined in the inside of the annular portion 20 of the collector disc plate 7, as shown in FIG. 8B.

The diameter of the collector disc plate 7 and the group of the electrodes was 38 mm. The position of the inner side of the annular portion 20 is located at the inner position of the group of the electrodes 6, as shown in FIGS. 8A and 8B. The thickness of the annular portion 20 was 1 mm, which is larger than a welding width of 0.8 mm.

Figure 9:
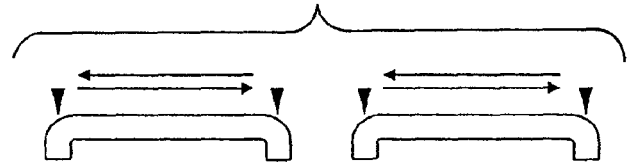
FIG. 9 is a diagrammatic cross sectional view of the radial projections formed in the collector disc plate of example 1, and shows start and end points of laser irradiation.

FIG. 9 shows, as same as FIG. 7, a cross sectional view of the projections 8 of the collector disc plate 7 of the lithium ion secondary battery 30 of example 1, wherein black triangles represent start and end points of laser beam welding. In FIG. 9 the start and end points of the laser beam welding are located on the projections and above the annular portion 20 of the collector disc plate 7.

In all examples including example 1 the collector foils in the center part of the group of the electrodes 6 were confined within the annular portion 20 without bending, since the central part of the group of the electrodes 6 cannot be bent.

Example 2

The lithium ion secondary battery 30 was assembled in the same manner as in example 1, except that the thickness A of the annular portion 20 was 0.8 mm.

Example 3

The diameter of the group of the electrodes 6 was set to be 36.2 mm, and the positive collector foil and negative collector foil exposed from the separator 5 were confined in the annular portion 20 without bending them. Except the above conditions, the lithium ion secondary battery 30 was assembled in the manner of example 1.

Example 4

The lithium ion secondary battery 30 was assembled in the same manner as in example 1, except that the thickness A was set to be 0.5 mm.

Example 5

Figure 10A:
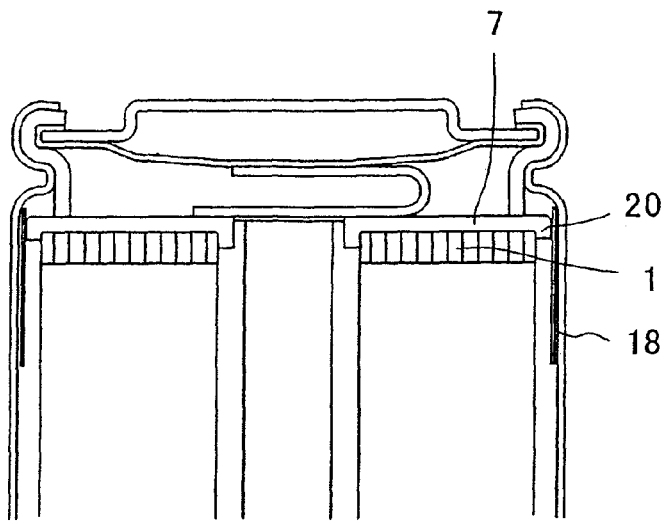
FIG. 10A shows an upper part (positive electrode side) of the lithium ion secondary battery of example 3.
Figure 10B:
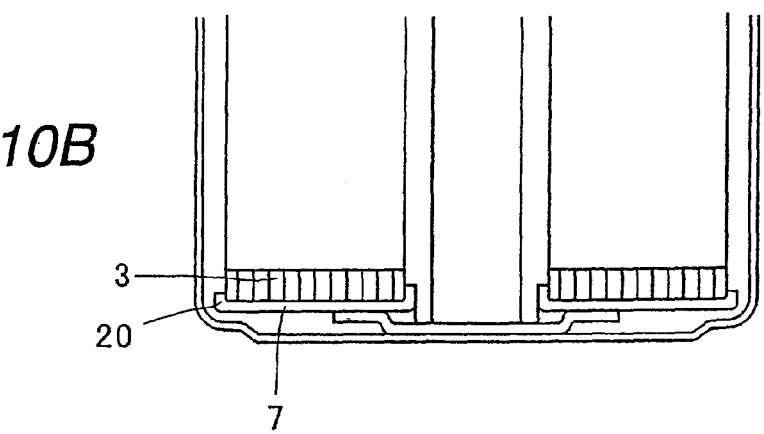
FIG. 10B shows a lower part (negative electrode side) of the lithium ion secondary battery of example 3.

The lithium ion secondary battery 30 was assembled in the same manner as in example 4, except that the diameter of the group of the electrodes was set to be 36.8 mm. The positive collector foil and the negative collector foil exposed from the separator were confined in the annular portion 20 without bending them, as shown in FIGS. 10A and 10B.

Comparative Example

Figure 11:
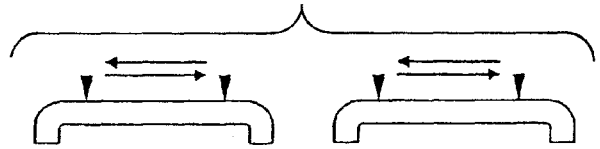
FIG. 11 is a diagrammatic cross sectional view of radial projections of a lithium ion secondary battery of a comparative example 1.

Using the collector disc plate and the group of the electrodes of one of examples 1 to 5, the lithium ion secondary battery 30 was assembled in which laser beam welding was performed by irradiating the top face of the projections but not above the annular portion 20 of the collector disc plate. Therefore, the start and end points of the laser beam welding were inside of the annular portion 20, as shown in FIG. 11.

Comparative Example 2

Figure 12:
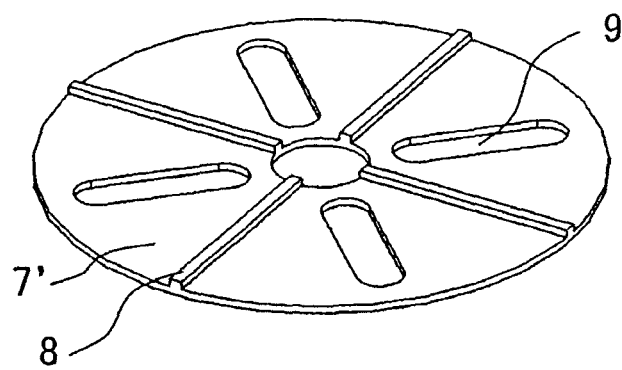
FIG. 12 shows a perspective view of a collector disc plate used in comparative example 2.
Figure 13:
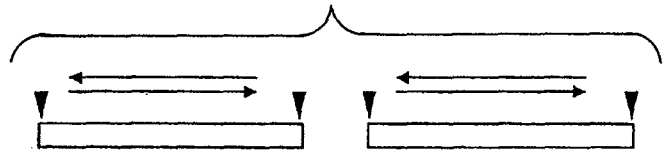
FIG. 13 is a diagrammatic cross sectional view of the radial projections formed in the collector disc plate of comparative example 2, where start and end of laser irradiation are shown.
Figure 14:
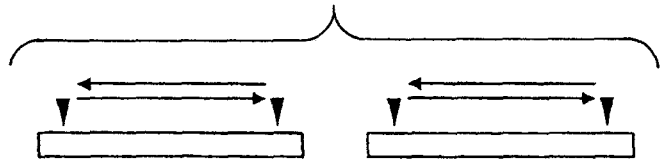
FIG. 14 is a diagrammatic cross sectional view of the radial projections formed in the collector disc plate of comparative example 3, where start and end positions of laser irradiation are shown.

Using a collector disc 7' shown in FIG. 12 and the group of the electrodes having a diameter of 38 mm, the lithium ion secondary battery 30 was assembled wherein the start and end points of the laser beam welding on the projections 8 were above the annular portion 20 of the collector disc plate 7', as shown in FIG. 13.

Comparative Example 3

Using the collector disc plate 7' shown in FIG. 12 and the group of the electrodes 6 used in comparative example 2, the lithium ion secondary battery was assembled wherein laser beam welding was performed in such a manner that start and end points of laser beam welding were not above the periphery of the collector disc plate.

The lithium ion secondary batteries prepared in the examples and comparative examples were investigated, and as a result, the following observation that may affect on quality and reliability of the secondary battery were obtained.

We could not find any adverse observation that may affect on quality and reliability of the secondary battery in case of batteries of examples 1 and 2.

In case of the battery of comparative example 2 the collector disc plate has no annular portion 7', and start and end points of laser beam welding were positioned above the periphery of the disc plate. The disc plate being welded had melting down and rupture at the start and end positions. Accordingly, the collector foil beneath the penetrated rupture had melting-down rupture. The separator in contact with the foils had melting-down rupture. These phenomena were common to the start and end points of laser beam welding. The concentration of energy at the start and end points and instable melting resulted in penetration of laser beam through the collector foil and separator.

On the other hand, when start and end points are positioned at points, which are remote from the periphery of the disc (inside of the circular periphery), comparative example 3 shows the result. Melting-down through-holes of a pinhole size were observed at the start and end points. The collector foil below the penetrate holes was melted down, and the separator in contact with the collector foils had local shrinkage by heat. That is, the status of start and end points of the laser beam welding (start and end points of laser beam irradiation) may be instable.

In the secondary battery of example 3 wherein the welding melting width (welding loop width) and the thickness of the annular portion 20 of the collector disc plate 7 were the same, observed were welding fusion in the collector foil at a position to be welded to one or two layers of the collector disc plate 7, and a partial shrinkage by heat in a side portion of the separator 5, which is smaller than that in case of comparative example 3. However, through holes were not observed in the collector disc plate 7. Since the collector foil is included inside of the annular portion 20 of the collector disc plate 7, the collector foil that becomes an outer periphery of the group of the electrodes is positioned at an inner corner of the annular portion 20 of the collector disc plate 7, and the value of the welding melt width and the thickness of the annular portion 20 of the collector disc 7. Thus, the damage to the secondary battery was the same level as in comparative example 3.

On the other hand, the above phenomena were not observed in example 2. Since the collector foil is bent and included within the annular portion 20 of the collector disc plate 7, the collector foil is remote from the inner corner of the annular portion 20 of the collector disc plate 7. As a result, the welding heat did not affect on the collector foil and neighborhood separator 5.

In example 4, despite that a thickness of the annular portion 20 of the collector disc plate is smaller than that of laser irradiation melting width, the collector foil and neighborhood separator did not receive heat affection. This is because the collector foil is bent and included in the annular portion 20 of the collector disc, the collector foil that becomes an outer portion of the group of the electrodes 6 is remote from the inner corner of the annular portion 20 of the collector disc plate 7.

However, in example 5 the same phenomena in example 3 were observed. In comparative example 1 cutting by welding of the collector foil and partial shrinkage of the separator in the neighborhood were observed, but the above results would have been predicted from examples 1-5 and comparative examples 2-3.

In the following advantages of the lithium ion secondary battery of the present invention will be made.

The lithium ion secondary battery 30 of this example comprises positive plate 2 and negative collector disc plate 4 whose collector foils have non-coated portions 1, 3 in one side thereof, part of the non-coated portion being exposed from a side of the separator 5. A collector disc plate 7 is bonded by welding to ends of the exposed non-coated portion 1, 3. Accordingly, machining of the non-coated portion into strip form is no longer necessary; efficiency of the assembly is increased and production cost is reduced.

The lithium ion secondary battery 30 of this example has a collector disc plate 7 having a periphery with an angular annular portion 20, which is bent toward the group of the electrodes. Therefore, a homogeneous welding, which is free from perforation of the collector disc plate 7 and thermal shrink and cutting by welding of the separator 5 can be performed in welding of side portion of the non-coated portions 1, 3 and the collector disc plate 7. As a result, it is possible to prevent an increase in an internal resistance and to increase reliability of welding.

As explained in the example, the side portions of the collector foil are included inside of the annular portion 20, and welding should preferably have start and end points at the annular portions.

Supply of welding irradiation energy should preferably be made from the rear side of the collector disc plate 7 opposite to the group of the electrodes 6. Laser beam energy for welding is preferable.

Further, when the thickness of the annular portion 20 of the collector disc plate is set to be larger than a melt width by welding, which is observed in the face of irradiation, it is possible to perform welding of the collector disc plate 7 and end portions of the non-coated portions under low impedance without machining of the non-coated portions 1, 3 into strip form (i.e. teeth form). This means that such problems as low processing speed and a large waste amount of foils (i.e. low yield of material) in the conventional technology will be removed.

In the conventional technology, when the strip form positive electrode and negative electrode having non-coated portions 1, 3 of the collector foils are wound together with the separator 5, the strips of the strip teeth were spread radially by a centrifugal force and the strips were wound into the group of the electrodes so that electrical insulation between the positive electrode and negative electrode was lost. According to the present invention, a potential of the above mentioned processing fault could be removed completely.

Since the strips of the teeth form foil may become an obstacle for filling and impregnating an electrolyte solution into the group of the electrodes, it took a long time for the impregnation, which may increase a commencement lead-time. However, according to the examples of the present invention, since the lithium ion secondary battery having a low impedance with the collector disc plate is obtained without forming strips or teeth of the non-coated portions, there is no obstacle to impregnation of the electrolyte solution, which eliminates the increase in the commencement lead-time.

The secondary batteries can be produced under stable conditions, and since it is possible to eliminate potentials of internal short-circuit and voltage reduction, lithium ion secondary batteries with high performance and high reliability can be produced.

Though the above examples of the present invention show the cases where the non-coated portions of both the electrode film and negative electrode film were not machined into strips or teeth form, the present invention does not limit the above. That is, one of non-coated portions of the positive electrode foil and negative electrode foil can be machined into the strips. However, machining the both of the non-coated portions of the positive electrode film and negative electrode film should be most preferable.

Though the examples show that the projections 8 formed in one side of the collector disc plate 7 are arranged in a radial direction, the present invention is not limited thereto. That is, the shape of the projection may be an involutes curve, for example. The all projections 8 should not be formed through the center to the periphery thereof. For example, some of them may be extended from the intermediate to the periphery.

The examples of the present invention show the cases where positive electrode film 2 and negative electrode film 4 have an active material coated on both faces thereof, but the present invention allows the cases where only one of the faces of the positive electrode film and negative electrode film is coated with the active material in case of a lamination structure wherein the coated surface of the positive electrode and the coated surface of the negative electrode are not opposed to each other.

Although in the above examples a fiber laser as a laser device for irradiating a laser beam on the projections 8 of the collector disc plate 7 is shown, the present invention does not limit the laser device to the above. For example, a pulse YAG laser device may be employed. The irradiation is not limited to continuous irradiation, but a pulse irradiation is allowed. In addition to laser beam welding devices, other type of welding devices using other energy than laser can be used. For example, there are electron beam welding, arc welding, TIG welding, plasma welding, etc. Since the electron beam welding device needs a vacuum chamber to surround parts to be welded in a vacuum, the device becomes large scale; in plasma welding devices and arc welding devices a welding speed is not sufficiently high. As a result, heat damage may be imparted to the parts to be welded. Accordingly, the laser welding devices among the various welding devices are most preferred.

Figure 15A:
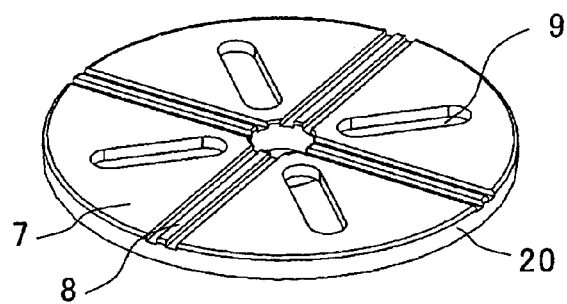
FIG. 15A shows a top perspective view of a collector disc plate of another example.
Figure 15B:
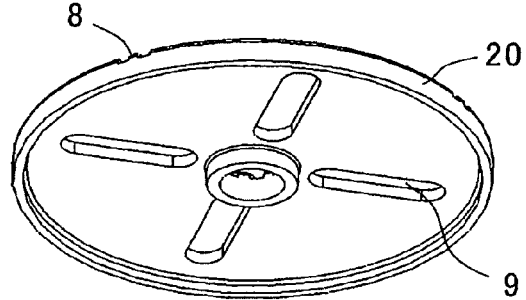
FIG. 15B shows a bottom perspective view of the collector disc plate of the another example.
Figure 15C:
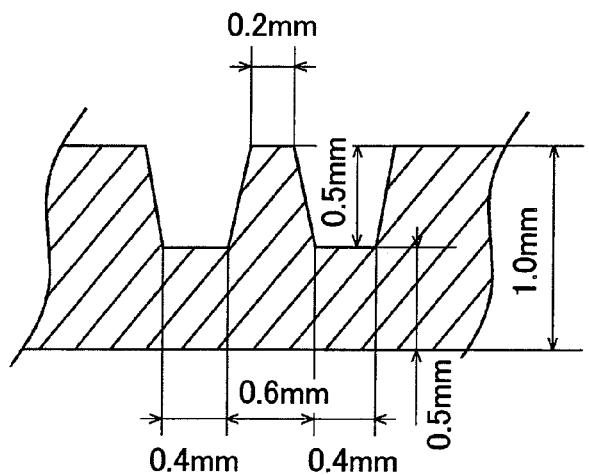
FIG. 15C shows a cross sectional view of the collector disc plate of the another example along the center line of the collector disc plate.

The examples show the cases where the projections 8 are formed in the collector disc plate 7, as shown in FIG. 8, the top of the projections is higher than the surface level of the disc plate. However, the parallel grooves are formed to form projections between the grooves, as shown in FIG. 15. The top of the projections may be the same level as that of the disc plate. The projections shown in FIGS. 8 and 15 have a function to limit the heat-affected zone to a limited area.

The lithium ion secondary battery of the examples of the present invention is particularly suitable for a high rate use.

In the present invention, the shape of the collector disc plate is not limited to the circular form shown in FIGS. 5, 12 and 15. The shape of the collector disc plate may be a rectangular form, if the cross sectional shape of the secondary battery is a rectangular form.

What is claimed is:

1. A lithium ion secondary battery comprising a case; a positive electrode film; a negative electrode film; a separator sandwiched between the positive electrode film and the negative electrode film, the films and the separator being arranged in multiple layers to form a group of electrodes enclosed in the case, the group of electrodes in the case being impregnated with a non-hydrous electrolyte solution, a positive collector disc plate connected to a positive electrode side of the group of the electrodes, and a negative collector disc plate connected to a negative electrode side of the group of the electrodes, wherein each of the electrode films has a non-coated portion extended along one side thereof, a part of the non-coated portion or the entire non-coated portion being exposed from a side of the separator, and wherein at least one of the collector disc plates is welded to the side of the exposed non-coated portion of the group of the electrodes at a welded portion, the periphery of each of the collector disc plates having a projected annular rim, which is bent towards the group of electrodes, wherein the annular rim of each of the disc plates covers an outer periphery of the group of the electrodes, and wherein an edge of the exposed non-coated portion is bent and included in the annular rim, and a thickness of the annular rim is larger than a width of the welded portion;

wherein each of the positive collector disc plate and the negative collector disc plate has radial projections on one face, the one face being on an opposite side of the collector disc plate from the other face opposing the group of electrodes, the radial projections extending from the center thereof towards the periphery thereof, and each of the projections is formed in a parallel groove extending along the projection.

2. The lithium ion secondary battery according to claim 1, wherein the edge portion of the exposed non-coated portion is included in the annular rim of the collector plate, and the edge portion of the exposed non-coated portion constitutes welded portions with the collector disc plate.

3. The lithium ion secondary battery according to claim 1, wherein the welded portion is formed between the edge of the exposed non-coated portion and the collector disc plate.

4. The lithium ion secondary battery according to claim 1, wherein the welded portion is free from any metal than the foil.

5. The lithium ion secondary battery according to claim 1, wherein the annular rim is spread outwardly.

6. The lithium ion secondary battery according to claim 1, wherein each of the positive collector disc plate and the negative collector disc plate has radial projections on one face, the one face being on an opposite side of the collector disc plate from the other face opposing the group of electrodes, the radial projections extending from the center thereof towards the periphery thereof.

7. The lithium ion secondary battery according to claim 1, wherein an entire peripheral edge of the exposed non-coated portion is bent and included in the annular rim.

* * * * *